United States Patent [19]

Anderson

[11] 4,093,581

[45] June 6, 1978

[54] EMULSION POLYMERIZATION OF VINYL CHLORIDE USING PREHOMOGENIZED MIXED EMULSIFIER SYSTEM

[75] Inventor: Donald F. Anderson, White Plains, N.Y.

[73] Assignee: Stauffer Chemical Company, Westport, Conn.

[21] Appl. No.: 740,989

[22] Filed: Nov. 11, 1976

[51] Int. Cl.$^2$ .............................................. C08L 27/06
[52] U.S. Cl. ..................... 260/29.6 MH; 260/29.6 R; 260/29.6 ME; 260/29.6 MQ; 526/207; 526/212
[58] Field of Search .................. 260/29.6 R, 29.6 ME, 260/29.6 MQ, 29.6 MH; 526/207, 212

[56] References Cited

U.S. PATENT DOCUMENTS

| | | | |
|---|---|---|---|
| 3,219,609 | 11/1965 | Perronin | 260/29.6 MQ |
| 3,324,097 | 6/1967 | Pears | 526/212 |
| 3,383,346 | 5/1968 | Smith | 260/29.6 MQ |
| 3,551,399 | 12/1970 | Yonezic et al. | 526/212 |
| 3,755,225 | 8/1973 | Pierce, Jr. | 526/212 |
| 3,974,133 | 8/1976 | Evans | 526/207 |

*Primary Examiner*—Harold D. Anderson
*Assistant Examiner*—Regenia F. Hughes
*Attorney, Agent, or Firm*—Richard P. Fennelly

[57] ABSTRACT

A one-step process for the emulsion polymerization of vinyl chloride using a water-soluble initiator and a prehomogenized aqueous emulsifier system of (1) a $C_{12}$-$C_{18}$ straight chain alkyl or alkenyl surfactant and (2) a $C_{16}$-$C_{20}$ straight chain alkyl or alkenyl alcohol and/or a straight chain saturated hydrocarbon having a carbon content of greater than 18 is disclosed. Suitable examples of straight chain surfactants include sodium lauryl sulfate and sodium oleate. Suitable alcohols include stearyl alcohol, cetyl alcohol and eicosanol. A suitable hydrocarbon is eicosane. The resulting homo- and co-polymer latices have excellent mechanical stabilities, particle sizes generally larger than obtainable using only the mixed surfactant system without prehomogenization of the emulsifier system and good thermal stability.

8 Claims, No Drawings

EMULSION POLYMERIZATION OF VINYL CHLORIDE USING PREHOMOGENIZED MIXED EMULSIFIER SYSTEM

BACKGROUND OF THE INVENTION

1. Field of the Invention

The present invention pertains to a one-step process for the formation of vinyl chloride polymers using a water-soluble initiator and a prehomogenized aqueous mixed emulsifier system.

2. Description of the Prior Art

The use of a straight chain surfactant, e.g., sodium lauryl sulfate, in the emulsion polymerization of vinyl chloride will generally result in the formation of vary small polymer particles unless the quantity of surfactant is carefully controlled by an incremental feed technique. One common way in which larger particles of polyvinyl chloride can be obtained is by first forming a "seed" particle of the polymer in an initial polymerization procedure, followed by a second polymerization or "seed growth" step. Some recently issued U.S. patents which relate to this seed growth technique are U.S. Pat. No. 3,383,346 to E. S. Smith, U.S. Pat. No. 3,642,740 to J. K. Pierce, Jr. and U.S. Pat. No. 3,755,225 to J. K. Pierce, Jr. et al. The effect of a mixed emulsifier system during only the second step of such a process has been studied in the scientific literature. J. Ugelstad et al. J. Polymer Sci., Symposium No. 42, 473-485 (1973).

In addition to the foregoing prior art, the presence of various alcohols, such as stearyl alcohol, as a component in a polymerization reaction medium has been studied by other investigators. For example, U.S. Pat. No. 3,324,097 to G. E. A. Pears and U.S. Pat. No. 3,654,248 to E. Iida et al., relate to a polymerization system wherein a homogenized vinyl chloride monomer is polymerized in the presence of an oil-soluble catalyst in a suspension polymerization procedure. When such a system is used a mixture of emulsion and suspension polymerized polyvinyl chloride particles are formed. The effect of a mixed emulsifier of surfactant and alcohol in a one-shot polymerization of styrene has also been studied: J. Ugelstad et al., Die Makromolekulare Chemie, Vol. 175, pp. 507-521 (1974); J. Ugelstad, J. Polymer Science, Polymer Letters, Vol. 11, pp. 503-513 (1973); and A. R. M. Azad et al., ACS Polymer Reprints, Vol. 16, No. 1, pp. 131-142 (April 1975).

Finally, a one-step emulsion polymerization process for forming vinyl chloride polymers is described in copending U.S. Ser. No. 740,990, entitled "Emulsion Polymerization of Vinyl Chloride Using Mixed Emulsifier System", filed on even date herewith in the name of Paul Kraft, wherein a mixed emulsifier system of a $C_{12}$-$C_{18}$ straight chain alkyl or alkenyl surfactant, e.g., sodium lauryl sulfate, and a $C_{16}$-$C_{20}$ straight chain alkyl or alkenyl alcohol and/or a saturated hydrocarbon having a chain length of greater than 18 carbon atoms e.g., cetyl alcohol is used. Although such a system gives a binodal distribution of polyvinyl chloride resins it is difficult to perform in a reproducible manner and can yield in successive runs products having vastly different particle size distributions.

It has not, however, been appreciated hitherto that a one-step polymerization procedure for vinyl chloride monomer can be achieved using a water-soluble initiator and a prehomogenized aqueous mixed emulsifier system in order to overcome the deficiencies associated with the prior technique of using a mixed emulsifier system. With use of the present invention a polydisperse distribution of polyvinyl chloride in the particle size range of from about 0.04 to about 1.1 microns is obtained with the bulk being in the range of from about 0.6 to about 0.7 microns. It has a generally larger amount of larger particles as compared to the prior technique and the resin blend has generally superior mechanical stability and thermal stability thereby making it more commericially desirable as a plastisol or organosol resin. The process is much more capable of yielding reproducible particle size results in successive runs than is the prior art process.

SUMMARY OF THE PRESENT INVENTION

The present invention relates to a one-step emulsion polymerization process which comprises the use of a prehomogenized mixed emulsifier of (1) a $C_{12}$-$C_{18}$ straight chain alkyl or alkenyl surfactant, such as sodium lauryl sulfate and sodium oleate, and (2) a $C_{16}$-$C_{20}$ straight chain alkyl or alkenyl alcohol, such as cetyl alcohol, oleyl alcohol, stearyl alcohol and eicosanol and/or a straight chain saturated hydrocarbon having a carbon content of greater than 18. The resulting latices have excellent mechanical stabilities, polydisperse particle sizes generally larger than obtainable using a mixed emulsifier system without prehomogenization, and good thermal stability. The products are useful as plastisol or organosol resins.

DESCRIPTION OF THE PREFERRED EMBODIMENTS

The polymerization medium which contains effective amounts for the desired polymerization of vinyl chloride monomer (and, optionally, comonomers), a water-soluble initiator, a mixed emulsifier which is in the form of a pre-emulsion and, if desired, a buffer.

Vinyl chloride monomer comprises at least 50%, preferably at least 85%, by weight of the entire monomeric component. Preferably, it is the sole monomer that is present. However, copolymers may be advantageously prepared in accordance with this invention. For example, copolymerizable mixtures, containing vinyl chloride and up to 49 percent vinyl acetate, but preferably in the range of 5 to 10 percent vinyl acetate, may be employed. Other monomers copolymerizable with vinyl chloride, which may be used in accordance with this invention, include: vinyl esters of other alkanoic acids, such as vinyl propionate, vinyl butyrate, and the like; the vinylidene halides, such a vinylidene chloride; vinyl esters of aromatic acids, e.g., vinyl benzoate; esters of alkenoic acids, for example, those of unsaturated mono-carboxylic acids such as methyl, acrylate, 2-ethyl hexyl acrylate, and the corresponding esters of methacrylic acid; and esters of alpha, beta-ethylenically unsaturated dicarboxylic acids, for example, the methyl, ethyl, propyl, butyl, amyl, hexyl, heptyl, octyl, allyl methallyl and phenyl esters of maleic, itaconic, fumaric acids, and the like. Amides such as acrylamide and methacrylamide, and nitriles, such as acrylonitrile, may also be suitably employed. Vinyl phosphonates, such a bis(beta chloroethyl)vinylphosphonate may also be employed. The water to monomer ratio in the reaction medium can be varied widely with values of from about 1.5 to about 2.5:1, preferably from about 1.7 to about 2.0:1, being representative.

The initiator or catalyst which is used in the present invention can be any of the well-known water-soluble initiators which are used in the emulsion polymerization of vinyl chloride monomer. Oil soluble catalysts cannot be used since they yield a mixture of suspension and emulsion particles rather than the desired polydisperse product. Such free radical, water-soluble initiators as the peroxygen type compounds ammonium persulfate, sodium perborate, potassium persulfate, sodium persulfate and potassium percarbonate are illustrative of initiators that may be employed. If desired, a redox system can be used. Representative of such a system is a hydrogen peroxide initiator/ascorbic acid activator combination or a potassium persulfate/ascorbic acid combination. Combinations of persulfates and bisulfites, as for example, potassium persulfate and sodium metabisulfite can also be used. The amount of said initiator which is used should be an amount which is effective to polymerize the monomers which are present in the reaction medium. Generally, from about 0.05% to about 1%, preferably about 0.075% to about 0.10%, based on the weight of monomers, of initiator or redox system is needed.

The mixed emulsifier system of the present invention contains: (1) a $C_{12}$-$C_{18}$ straight chain alkyl or alkenyl surfactant and (2) a $C_{16}$-$C_{20}$ straight chain alkyl or alkenyl alcohol and/or saturated hydrocarbon of greater than 18 carbon atom chain length and is present in the reaction medium as a prehomogenized blend when the polymerization is begun. In such a pre-homogenized blend the surfactant and alcohol and/or hydrocarbon are present as a complex which coats the individual vinyl chloride monomer droplets and is responsible for the particle size distribution of the resin particles which result and their desirable physical properties. The use of a mixed emulsifier which has not been prehomogenized results in a binodal particle size distribution wherein the average particle size of the particles is often lower and wherein the resin particles do not possess the characteristics of the product of this invention. In such a non-prehomogenized system the surfactant and alcohol are uncomplexed so as to allow the alcohol to penetrate to the interior of the individual vinyl chloride monomer droplets. This allows surfactant micelles to form leading to production of a greater portion of smaller resin particles. The use of such a non-pre-homogenized polymerization technique also leads to irreproducibility problems as described before.

The $C_{12}$-$C_{18}$ straight chain surfactant which is useful in practicing the present invention has either the formula ROSO$_3$A or the formula RC(O)OA, where R is a $C_{12}$-$C_{18}$ straight chain alkyl or alkenyl group and A is an alkali metal, alkaline earth metal or alkanol amine of up to 6 carbon atoms. Representative alkali metal cations are sodium, potassium and (for purposes of this invention) ammonium. An alkaline earth metal cation is calcium. Exemplary surfactants for use in the present invention include sodium lauryl sulfate, sodium tridecyl sulfate, sodium myristyl sulfate, sodium cetyl sulfate and sodium stearyl sulfate. Also suitable are compounds otherwise similar to any of the foregoing but where sodium is replaced by potassium, calcium, ammonium or alkanol amines of up to six carbon atoms. Compatible mixtures of any of the foregoing surfactants can be used.

The $C_{16}$-$C_{20}$ straight chain alkyl or alkenyl alcohols which are to be used in the mixed emulsifier system of the present invention include such alcohols as cetyl alcohol, oleyl alcohol, stearyl alcohol and eicosanol. A representative saturated hydrocarbon having a chain length of greater than 18 carbon atoms is eicosane. Compatible mixtures of any of the foregoing second components of the mixed emulsifier can be used.

It is important to the success of the present invention that the alkyl or alkenyl group on the surfactant and other component of the mixed emulsifier be a straight chain rather than being either branched or on arylalkyl group. It has been found that arylalkyl surfactants, such as the alkylaryl sulfonates, and branched chain surfactants, such as 2-ethylhexyl sulfate, do not form the desired complex with the other component possibly due to steric interference caused by the bulkier branched chain and arylalkyl groups. The use of ethoxylated surfactants, such as the ethoxylated alkyl phenols and alcohols, should also be avoided since they give the surfactant too much of a polar character and tend to inhibit free radical polymerization due to the presence of benzoic hydrogens.

The two components of the mixed emulsifier are first prehomogenized by subjecting them to agitation in water when they are both in the liquid state in any suitable agitation apparatus until a visually homogeneous mixture is formed. The mixture of the two components may have to be heated if one or both of the selected components is a solid at ambient temperature to above the melting point of each component or components. The monomeric reactants and initiator can then be added for the polymerization reaction.

The amount of such mixed emulsifier system which is used must be sufficient to maintain a stable emulsion in the reaction environment. Use of smaller amounts than described herein will result in coagulation of the latex, whereas use of larger amounts will result in undesirable contamination of the product without providing any other significant benefit. The weight ratio of surfactant to alcohol in the mixture can range anywhere from about 1:1 about 1:4, preferably from about 1:2 to about 1:3 in order to produce the polydisperse product of the present invention having the desirable physical properties associated with the present invention. The amount of mixed emulsifier to vinyl chloride monomer (optionally in the presence of the copolymerizable monomers) is from about 0.7 to about 3%, preferably 0.8% to about 2%, by weight of all such copolymerizable monomers.

The presence of a suitable buffer, e.g., borax, in order to maintain the reaction medium at a pH of from about 5 to about 8, preferably from about 6 to about 7.5, is highly desirable since it will substantially retard any hydrolysis of the surfactant, thereby maintaining the integrity of the complexed emulsifier system.

The polymerization process of the present invention is conducted by heating the reaction mixture to a temperature of from about 45° C. to about 70° C. for about 3 hrs. to about 5 hrs.

The foregoing invention is illustrated by the Examples which follows

EXAMPLE 1

This Example illustrates a number of polymerizations according to the process of the present invention that were conducted in a 2 gallon (7.6 liter) stainless steel laboratory reactor (Runs 1-6) as well as a 30 gallon (113.6 liter) pilot plant reactor (Runs 7-9) in a one step process in 6 hours.

The basic polymerization recipe that was used in all runs (unless noted otherwise) contained the following ingredients:

| Ingredient | Amount (in grams) |
| --- | --- |
| Deionized water | 4500 |
| Vinyl chloride monomer | 3000 |
| Stearyl alcohol (available from Procter & Gamble) | 67 |
| Sodium Lauryl Sulfate (30% by weight solution - "Sipex UB" from Alcolac Chemical Corp.) | 75 |
| Potassium persulfate initiator | 9 |
| Sodium tetraborate buffer | 1.5 |

A premix of the mixed emulsifier system was first prepared by adding the stearyl alcohol, sodium lauryl sulfate and buffer to the water and was homogenized at 250 rpm for 30 minutes at 65° C. in the reactor. This temperature is above the melting point of the stearyl alcohol. The mixture was then cooled to 30° C. and vinyl chloride monomer and initiator were added. This latter temperature is low enough to prevent premature reaction of the vinyl chloride monomer. The mixture was agitated for an additional 15 minutes to disperse the vinyl chloride monomer throughout the reaction medium and the temperature was raised to 59°-60° C. to initiate the polymerization.

The molar ratio of stearyl alcohol to sodium lauryl sulfate in the mixed emulsifier was 3:1, and the amount of sodium lauryl sulfate, based on vinyl chloride monomer, was 0.75%.

The Table that is given on the page which follows sets forth some typical data that were obtained.

TABLE

| Run No. | Latex Stability (min.) | Latex pH | % Dry Coagulum | Particle Size (microns) | Relative Viscosity |
| --- | --- | --- | --- | --- | --- |
| 1 | 14 | 7.6 | 0.15 | 0.10–0.87 | — |
| 2 | 15 | 8.3 | 0.23 | 0.04–1.01 | — |
| 3 | 45 | 7.8 | 0.05 | 0.04–1.02 | 1.90 |
| 4 | 15 | 8.3 | 0.38 | 0.04–1.05 | 1.93 |
| 5 | 7 | 7.8 | 1.0 | 0.04–1.01 | — |
| 6 | 11 | 8.1 | 0.19 | — | — |
| 7 | 9 | 4.2 | nil | 0.06–0.95 | 2.26 |
| 8 | 8 | 4.2 | nil | 0.06–0.81 | 2.01 |
| 9 | 15 | 3.8 | nil | 0.06–1.09 | — |

Footnotes:
The latex stability is measured by agitating the product latex in a Hamilton Beach laboratory mixer set at low speed. The time required to coagulate the product in the mixer is determined by visual inspection. This test gives a measure of the time required for a latex to coagulate or set-up. Higher times are more desirable. Coagulation adversely affects the ease with which latex can be pumped in commercial production environments.
The amount of dry coagulum is based on the weight of the monomer charge. Lower amounts of coagulum are desirable since coagulum adversely affects commercial operations.
The relative viscosity is the ratio of the kinematic viscosity of a specified solution of the polymer (1% by weight in cyclohexanone at 25° C.) to the kinematic viscosity of the pure solvent.
The following changes in procedure were made in Runs 3-9, inclusive:
Run 3: The sodium lauryl sulfate was obtained from the Richardson Co. and 15 g. of epoxidized soybean oil ("Paraplex G-62", from Rohm & Haas Co.) was added to the reaction.
Run 4: The sodium lauryl sulfate was the same used in Run 3 and was present at 0.65%, based on the weight of monomer.
Run 5: The sodium lauryl sulfate was the same used in Run 3 and was present at 0.53%, based on the weight of monomer.
Run 6: The sodium lauryl sulfate was obtained from Henkel and was present at 0.60%, by weight of the monomer.
Runs 7 to 9: A hydrogen peroxide/ascorbic acid catalyst system was used in a 4:1 weight ratio. The largest distribution of particles fell within the particle size range of 0.6 to 0.8 microns.

Runs 1-6 represent laboratory scale batches in which the monomer conversion was about 95%. Good mechanical stability, low coagulum and the desired particle size of about 1 micron were obtained consistently. Runs 4-6 represent successful attempts to lower the surfactant level. In Runs 7-9 a $H_2O_2$/Ascorbic Acid redox catalyst system was used as opposed to the $K_2S_2O_8$ initiator employed in the 2 gallon laboratory experiments. This acidic catalyst system would account for the low pH values (3.8-4.2) obtained in the resulting latexes. This pH can easily be adjusted via an increase in the level of buffer. The mechanical stability, coagulum levels and particle sizes in Runs 7-9 were found to be comparable to that obtained in laboratory experiments.

EXAMPLE 2

This Example illustrates the use of the present process in the synthesis of a vinyl chloride/vinyl acetate/bis(betachloroethyl)vinylphosphonate terpolymer in a one-step process using the same procedure set forth in Example 1.

The following two reaction mixtures were subjected to emulsion polymerization in bottles for 4 hours at a temperature of about 54° C. using a cylindrically rotating polymerization bath set at about 16 rpm:

| Ingredient | Mixture A (in g.) | Mixture B |
| --- | --- | --- |
| Vinyl chloride monomer | 127.5 | 127.5 |
| Vinyl acetate monomer | 15.0 | 15.0 |
| Bis(beta-chloroethyl) vinylphosphonate monomer | 7.5 | 7.5 |
| 1% (1:3 weight ratio) sodium lauryl sulfate/stearyl alcohol solution | 112.5 | 150.0 |
| 1% solution of sodium bicarbonate | 20.0 | 20.0 |
| 1% solution of sodium persulfate | 75.0 | 75.0 |
| Deionized water | 97.5 | 60.0 |

The products from each of the reaction mixtures was tested for mechanical stability using a Hamilton Beach test, percent coagulum, particle size and percent latex solids. The results are set forth below.

| Mixture | Mech. Stab. (sec.) | Coagulum Level (%) | Particle Size (microns) | Latex Solids (%) |
| --- | --- | --- | --- | --- |
| A | >4200* | 0.13 | 0.09–2.31 | 34 |
| B | >3000* | 0.12 | 0.09–0.93 | 36 |

*neither sample had coagulated at the given time

The foregoing illustrate certain preferred aspects of the present invention and should not be construed in a limiting sense. The claims which follow set forth the subject matter on which protection is desired.

What is claimed is:

1. In an emulsion polymerization procedure for forming vinyl chloride homopolymers or copolymers by heating a monomer charge containing vinyl chloride in the presence of a water soluble initiator and an emulsifier to form a latex containing particles of said polymers, the improvement which comprises using as an emulsifier, a prehomogenized mixture of: (1) at least one $C_{12}$-$C_{18}$ straight chain alkyl or alkenyl surfactant of the formula $ROSO_3A$ or $RC(O)OA$, where R is a $C_{12}$-$C_{18}$ straight alkyl or alkenyl group and A is an alkali metal cation, alkaline earth metal cation or alkanol amine of up to 6 carbon atoms and (2) at least one $C_{16}$-$C_{20}$ straight chain alkyl or alkenyl alcohol or saturated hydrocarbon having a chain of greater than 18 carbon atoms to effect formation of the polymers in said latex in a single step.

2. A process as claimed in claim 1 wherein the $C_{12}$-$C_{18}$ straight chain alkyl surfactant is sodium lauryl sulfate.

3. A process as claimed in claim 1 wherein the $C_{16}$-$C_{20}$ straight chain alkyl alcohol is stearyl alcohol.

4. A process as claimed in claim 1 wherein the amount of the emulsifier mixture which is present is from about 1.7% to about 3%, by weight, based on the amount of polymerizable monomers.

5. A process as claimed in claim 1 wherein the weight ratio of surfactant to alcohol in the mixture ranges from about 1:1 to about 1:4.

6. A process as claimed in claim 1 wherein the surfactant is sodium lauryl sulfate and the alcohol is stearyl alcohol.

7. A process as claimed in claim 6 wherein the combined amount of surfactant and alcohol ranges from about 0.8% to about 2.0% by weight of the polymerizable monomers.

8. A process as claimed in claim 6 wherein the weight ratio of surfactant to alcohol ranges from about 1:2 to about 1:3.

* * * * *